United States Patent
Malakapalli et al.

(10) Patent No.: US 9,438,662 B2
(45) Date of Patent: Sep. 6, 2016

(54) ENABLING SECURE REMOTE ASSISTANCE USING A TERMINAL SERVICES GATEWAY

(75) Inventors: Meher Malakapalli, Sammamish, WA (US); Mathew John, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1589 days.

(21) Appl. No.: 11/799,288

(22) Filed: Apr. 30, 2007

(65) Prior Publication Data

US 2008/0270612 A1    Oct. 30, 2008

(51) Int. Cl.
- G06F 15/16 (2006.01)
- H04L 29/08 (2006.01)
- H04L 29/06 (2006.01)
- H04L 29/12 (2006.01)

(52) U.S. Cl.
CPC ........... *H04L 67/025* (2013.01); *H04L 63/029* (2013.01); *H04L 63/166* (2013.01); *H04L 29/1249* (2013.01); *H04L 61/256* (2013.01)

(58) Field of Classification Search
CPC  H04L 29/1249; H04L 63/029; H04L 67/025
USPC ................. 709/217, 218, 219, 227, 228, 229
See application file for complete search history.

(56) References Cited

U.S. PATENT DOCUMENTS

| | | | |
|---|---|---|---|
| 6,393,475 B1 | 5/2002 | Leong et al. | |
| 6,928,464 B2 | 8/2005 | Appiah et al. | |
| 6,950,936 B2 | 9/2005 | Subramaniam et al. | |
| 6,973,482 B2 | 12/2005 | Mohammed et al. | |
| 7,870,153 B2 * | 1/2011 | Croft et al. | 707/781 |
| 2003/0065864 A1 * | 4/2003 | Hollinger | 710/305 |
| 2005/0021772 A1 * | 1/2005 | Shedrinsky | 709/228 |
| 2005/0198380 A1 | 9/2005 | Panasyuk et al. | |
| 2005/0267779 A1 * | 12/2005 | Lee et al. | 705/1 |
| 2006/0031407 A1 | 2/2006 | Dispensa et al. | |

(Continued)

FOREIGN PATENT DOCUMENTS

| | | |
|---|---|---|
| KR | 1020030012286 | 2/2003 |
| KR | 1020050092845 | 9/2005 |

OTHER PUBLICATIONS

"Apple Remote Desktop 3", Date: Nov. 2006, http://images.apple.com/remotedesktop/pdf/ARD31_TO.pdf.

Mei, et al., "A Remote Personal Device Management Framework Based on SyncML DM Specifications", Date: 2005, pp. 185-191, http://delivery.acm.org/10.1145/1080000/1071275/p185-mei.pdf?key1=1071275&key2=1848310711&coll=GUIDE&dl=GUIDE&CFID=13054754&CFTOKEN=62234491.

(Continued)

*Primary Examiner* — Joseph Greene
(74) *Attorney, Agent, or Firm* — Kate Drakos; Micky Minhas

(57) ABSTRACT

A secure remote assistance session between computers that are behind firewalls and/or NAT devices is provided by an arrangement that uses a terminal services ("TS") gateway to enable utilization of a remote desktop protocol ("RDP") connection by a terminal services client in a reverse direction to that used in a conventional terminal services session. The connection is made via a regular TS gateway protocol mechanism by which the TS client behind a firewall establishes a connection to the remote server that is typically behind a firewall that protects a corporate network. The server then functions as the terminal services client to tunnel RDP data through the established TS gateway connection through the NAT firewall to a client. Thus, the server and client reverse roles after the TS gateway connection is made to thereby enable remote viewing of the graphical user interface that is displayed by the client in support of the remote assistance session.

15 Claims, 5 Drawing Sheets

(56) References Cited

U.S. PATENT DOCUMENTS

| | | |
|---|---|---|
| 2006/0037072 A1* | 2/2006 | Rao et al. .................. 726/14 |
| 2006/0090136 A1 | 4/2006 | Miller et al. |
| 2006/0168136 A1* | 7/2006 | Bethlehem et al. .......... 709/219 |
| 2006/0195895 A1 | 8/2006 | Ben-Shachar et al. |
| 2007/0005734 A1 | 1/2007 | Abdo |
| 2007/0233804 A1* | 10/2007 | Palekar .................. H04L 67/08 |
| | | 709/208 |

OTHER PUBLICATIONS

Tulloch Mitch, "Using Remote Assistance with Windows Firewall Enabled", http://www.windowsnetworking.com/articles_tutorials/Using-Remote-Assistance-Windows-Firewall-Enabled.html?printversion.

"Notice of Allowance Received for Taiwan Patent Application No. 97108532", Mailed Date: Dec. 23, 2013, Filed Date: Mar. 11, 2008, 4 Pages.

* cited by examiner

ENABLING SECURE REMOTE ASSISTANCE USING A TERMINAL SERVICES GATEWAY

BACKGROUND

Computer users, particularly users without much technical expertise, often have configuration problems or usage questions that are difficult for a support professional or even just a friend or family member to diagnose and fix over the phone. Remote assistance provided over a network or Internet connection is an effective way for users to get the help they need and makes it easier and less costly for corporate helpdesks to assist their users. After receiving a request for remote assistance, the helper (e.g., helpdesk expert) can remotely connect to the problem computer, view its desktop screens, and temporarily take control of the computer by sending keyboard and mouse commands over the network connection.

Remote assistance has proven to be difficult to provide in the case where a remote user (i.e., the "helpee") is behind a NAT (network address translator) firewall and the helper is inside a corporate network which is protected by an edge or perimeter type firewall. NAT firewalls are commonly used in small and/or home networks to remap IP (Internet Protocol) addresses of computers in the small network to a single IP address that is typically provided by an Internet gateway using a cable or DSL (digital subscriber line) connection, for example. The perimeter firewall is typically utilized to monitor traffic between the internal corporate network and a public network/Internet by inspecting incoming traffic for malware (i.e., malicious software such as viruses, trojan horses, rootkits, spyware, etc.). In addition, remote assistance may be difficult to implement when the helpee is inside a corporate network behind a firewall, and the helper is inside a different corporate network and also behind a firewall.

Current solutions to these problems include using an intermediary, such as a node on the Internet, where the helper and helpee meet to make a connection. While satisfactory in some situations, the Internet node is insecure, and typically requires the deployment of additional resources and often imposes scalability limitations due to the availability of such nodes. An alternative to the intermediary is for network administrators to open new incoming ports (in the case of the perimeter firewall) or map an incoming port to a specific computer in the network (in the case of the NAT firewall). However, network administrators are often hesitant to open or map ports since such actions are inherently insecure, and can result in significant risks to the security of the network or enterprise, which defeats the intended purpose of the firewalls.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A secure remote assistance session between computers that are behind firewalls and/or NAT devices is provided by an arrangement that uses a terminal services ("TS") gateway to enable utilization of a remote desktop protocol ("RDP") connection by a terminal services client in a reverse direction to that used in a conventional terminal services session. The connection is made via a regular TS gateway protocol mechanism by which the TS client behind a firewall establishes a connection to the remote server that is typically behind a firewall which protects a corporate network. The server then functions as the terminal services client to tunnel RDP data using the established TS gateway connection through the NAT firewall to a client. Thus, the server and client reverse roles after the TS gateway connection is made. In these reversed roles, the server (i.e., the original client) sends control messages to the client. The server receives rendering data from the client (i.e., the original server) to thereby enable remote viewing of the graphical user interface that is displayed by the client in support of the remote assistance session.

In various illustrative examples, a helpdesk behind a corporate network firewall provides remote assistance to a remote client (e.g., a home user) that is behind a NAT firewall that is used for Internet access. In one illustrative example, the remote client accesses a web link provided by the TS gateway which, when activated, establishes an RPC/HTTPS (Remote Procedure Calls using Hypertext Transfer Protocol with SSL (Secure Socket Layer)) connection between a plug-in module exposed by the TS gateway and a COM-type (Common Object Model) component such as ActiveX on the remote client. In another illustrative example, a remote port from the client is forwarded to the TS gateway. In both illustrative examples, the connection functions with the TS gateway just like a regular connection that is initiated by the remote client (through the ActiveX component) to a helpdesk server inside the corporate network that is running a terminal services client. The helpdesk server runs a remote assistance application to load a terminal services client to tunnel RDP display data through the NAT firewall using the established TS gateway connection to the remote client. This creates an end-to-end connection over which RDP data including graphical rendering data and commands may be streamed between the helpdesk and remote client during the remote assistance session.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
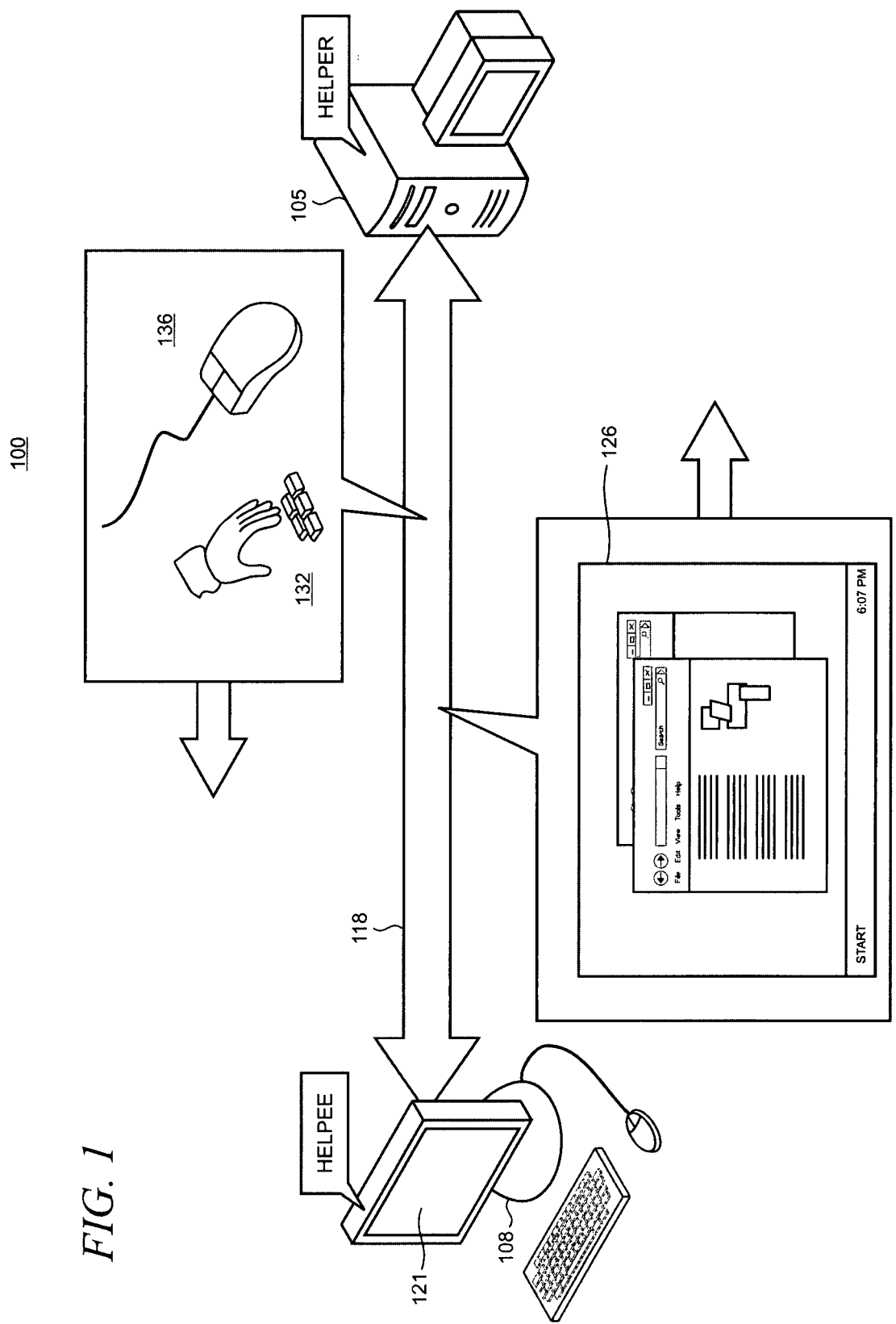
FIG. 1 shows an illustrative environment in which remote assistance is provided from a helper to a helpee.

FIG. 1 shows an illustrative remote assistance environment 100 in which remote assistance is provided from a server called the helper 105 to a helpee 108 at a client. Illustrative environment 100 is described below in order to provide context for the present arrangement for enabling secure remote assistance between computers. A typical remote assistance scenario entails a user at the remote client requiring assistance from a helpdesk server that is part of a corporate network. Accordingly, the remote client as the helpee 108 initiates a request for remote assistance using, for example, an instant web messaging service or email. The helper 105, such as an expert at the helpdesk, makes a connection to the helpee 108 to thereby conduct a remote assistance session and render the requested assistance to the user at the remote client.

The helper 105 and helpee 108 are typically in communication over a network 118 which can be arranged as a local area network, or arranged as a wide area network which may use portions of a public network such as the Internet. In environment 100, helper 105 and helpee 108 communicate over network 118 using a terminal services session, which in this illustrative example uses a remote desktop protocol ("RDP") that typically operates over a TCP/IP (Transmission Control Protocol/Internet Protocol) connection between the helper 105 and helpee 108.

Remote assistance typically follows a procedure in which, responsively to an assistance request from the helpee 108, the helper initiates a connection using authentication data that is exchanged out-of-band. Once the helpee 108 accepts the connection, it utilizes a functionality in which the helper 105 is enabled with an ability to view the screen (i.e., the graphics that are normally displayed on a monitor 121 or display device that is coupled to the helpee 108) by virtue of rendering data 126 that is streamed over RDP on network 118 to the helper 105.

The helper 105 may also temporarily take control of the helpee 108 by which keyboard events 132 and mouse events 136 are sent as control messages over RDP from the helper 105 to help the helpee 108. A helpdesk expert at helper 105 may thus interact with the computer supporting the helpee 108 as if the helpdesk expert were seated in front of the client helpee 108.

In the remote assistance environment 100 shown in FIG. 1, the graphical RDP rendering data flows from the remote client (i.e., the helpee 108) to the helpdesk server (i.e., helper 105), while the RDP controls message (i.e., the keyboard and mouse events 132 and 136) flow from the server helper 105 to the remote client helpee 108, during a remote assistance session.

Figure 2:
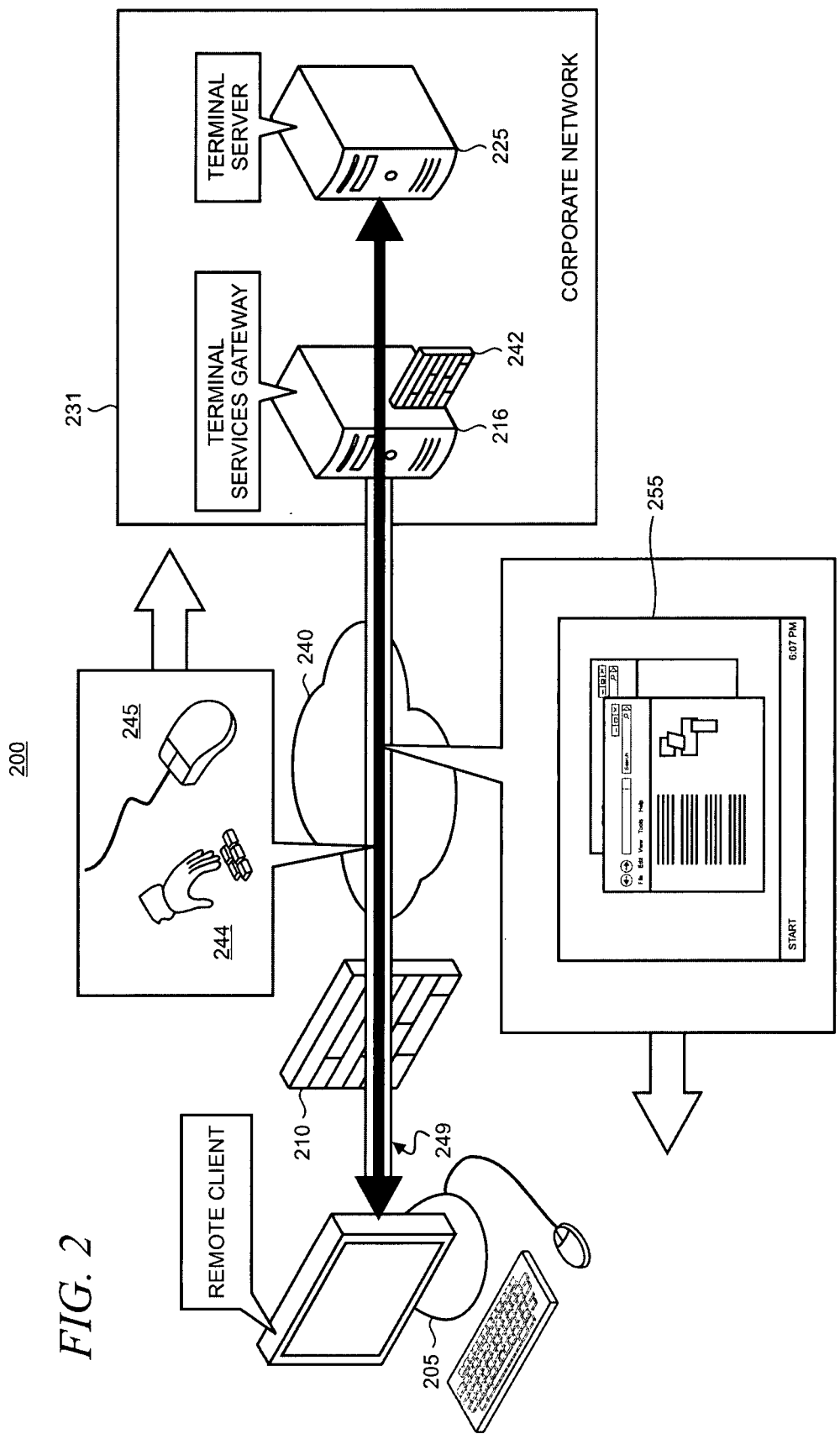
FIG. 2 shows an illustrative architecture in which a remote client behind an NAT firewall accesses a terminal server inside a corporate network by using a terminal service gateway to support a terminal services session.

FIG. 2 shows an illustrative terminal service architecture 200 in which a remote client 205 behind an NAT (network address translator) firewall 210 accesses, using a terminal service ("TS") gateway 216, a terminal server 225 that is located inside an enterprise or corporate network 231 to thereby initiate a terminal services session. Client 205 is considered remote as it is outside the corporate network 231 and accesses the corporate network 231 via an external network 240. In most applications of the present arrangement for enabling secure remote assistance, external network 240 is arranged at least in part using a public network such as the Internet. In alternative arrangements, external network 240 may be arranged as a virtual private network ("VPN"). However, the TS gateway 216 is normally configured to enable authorized remote clients to connect to terminal servers inside the corporate network 231 from any Internet-connected device running a terminal services client (which is also referred to as a remote desktop client). As shown in FIG. 2, the TS gateway 216 is co-located with a firewall 242 that monitors incoming traffic to the corporate network 231 from the external network 240.

In a typical terminal services environment, an application runs entirely on the terminal server 225. The remote client 205 performs no local execution of application software. The server transmits the graphical user interface to the client. The client transmits the user's input back to the server. Accordingly, as shown in FIG. 2, the remote client 205 generates keyboard events 244 and mouse events 245 that are redirected from the remote client 205 to the terminal server 225 over a network connection, as indicated by reference numeral 249, to the corporate network 231. The terminal server 225 utilizes its own virtual keyboard and mouse driver to receive and interpret these keyboard and mouse events.

At the terminal server 225, an RDP video driver renders display output 255 by constructing rendering information into network packets using the RDP protocol and sending them over the network 249 to the remote client 205. The display protocol is typically encrypted, generally in a bi-directional manner, although in some cases only data from the remote client 205 to the terminal server 225 is encrypted. Such encryption is utilized to prevent discovery of user's passwords and other sensitive information by "sniffing" the wire.

At the remote client 205, rendering data 255 is interpreted into corresponding GDI API (Graphics Device Interface Application Programming Interface) calls to thereby show graphical screens and a user interface on a coupled display device or monitor. Thus, as shown in FIG. 2, RDP control messages flow from the remote client 205 to the terminal server 225 and RDP graphical rendering data flows from the terminal server 225 to the client 205 during a terminal services session. This is opposite to the data flow used in the remote assistance scenario as shown in FIG. 1 and described in the accompanying text.

Figure 3:
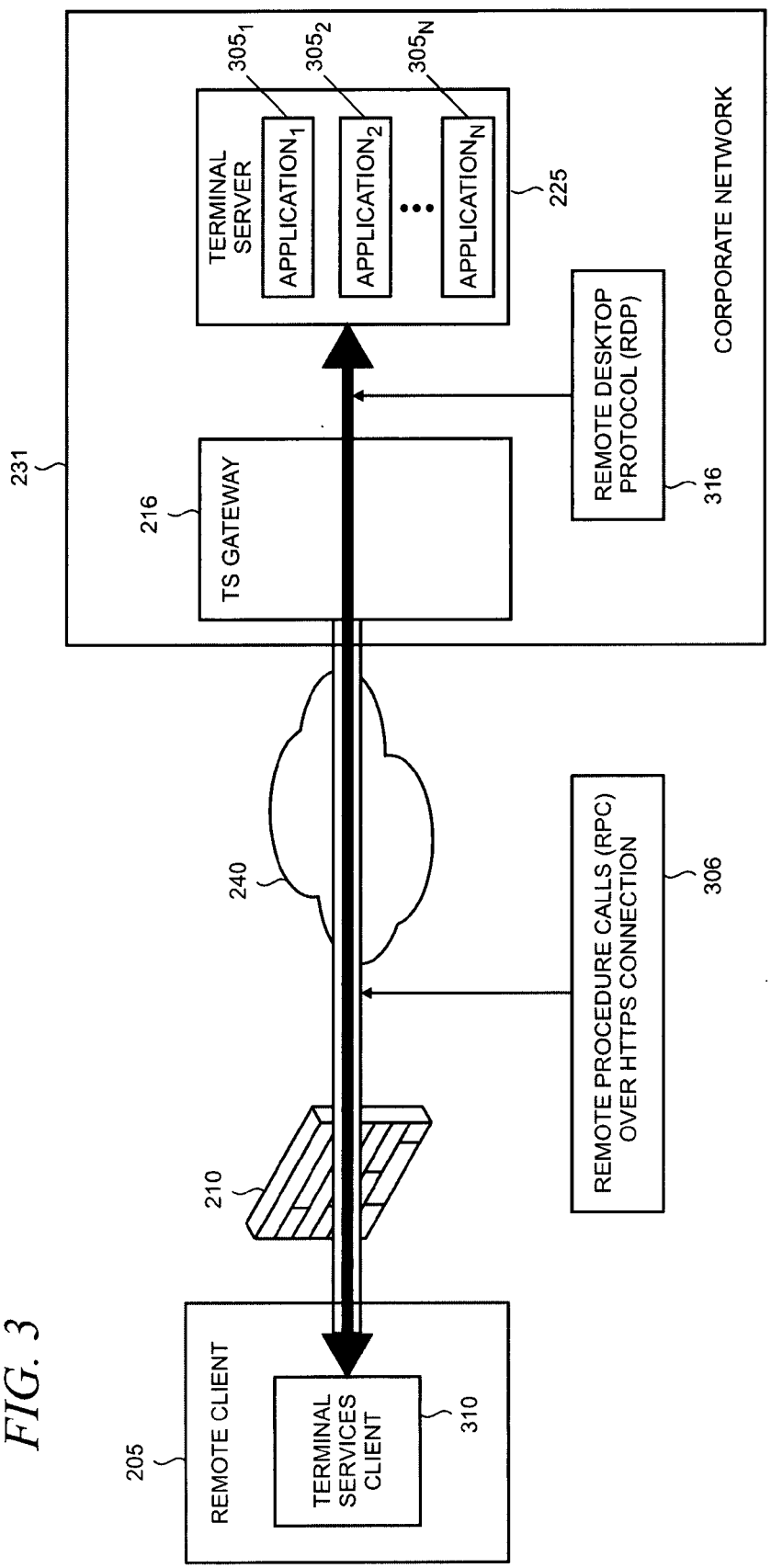
FIG. 3 shows details of the illustrative architecture shown in FIG. 2.

FIG. 3 shows details of the architecture 200 shown in FIG. 2. In this illustrative example, the TS gateway 216 uses RDP tunneled through RPC/HTTPS (Remote Procedure Calls using Hypertext Transfer Protocol with SSL (Secure Socket Layer) encryption for security) connection (i.e., "pipe") as indicated by reference numeral 306 to form a secure, encrypted connection between the remote client 205 and the terminal server 225 on which one or more productivity applications 305-1, 2 . . . N are resident even, as in this case, when the remote client is behind an NAT firewall 210. Accordingly, the TS gateway 216 typically eliminates the need to configure VPN connections, enabling remote clients to connect to corporate network 231 through the Internet, while providing a comprehensive security configuration model that enables administrators to control access to specific resources on the network. It is emphasized that RPC/HTTPS provides one possible method of connecting the remote client 205 to the TS gateway 216. In alternative implementations, other connection methods or protocols may be used as the TS gateway is typically configured using a pluggable transport mechanism. Thus, for example, the RPC/HTTPS connection could be replaced with a tunnel provided using SSTP (Secure Socket Tunneling Protocol) or other protocols without negatively affecting the capability for providing secure remote assistance as described herein.

A terminal services client 310, which is typically embodied as an executable file on the remote client 205, uses the RPC/HTTPS pipe 306 to make an RDP connection 316 to the terminal server 225 to thereby establish a connection which supports a terminal services session.

Figure 4:
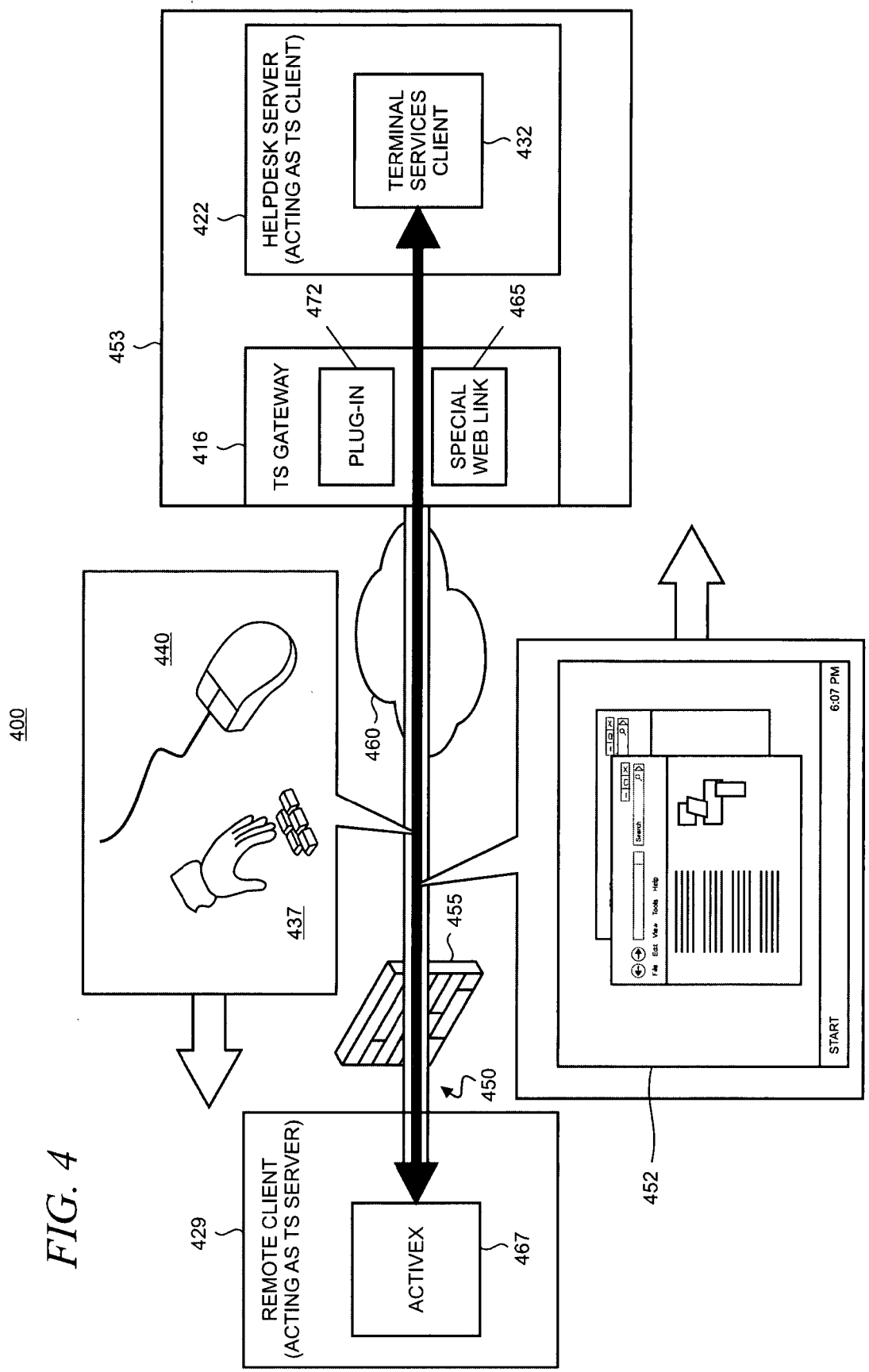
FIG. 4 shows an illustrative arrangement using a terminal services gateway to support remote assistance in which the RDP flow reverses and a helpdesk server performs as the terminal services client and the remote client performs as the terminal services server.

FIG. 4 shows an illustrative arrangement 400 using a TS gateway 416 to support remote assistance in which the RDP flow reverses and a helpdesk server 422 performs as the terminal services client and a remote client 429 performs as the terminal services server. Here, the help server 422 generates keyboard events 437 and mouse events 440 responsively to input from a user (e.g., a helpdesk expert) which are sent in an RDP stream over an RPC/HTTPS pipe as indicated by reference numeral 450. The remote client 429 is arranged to stream graphical RDP rendering data 452 to the help desk server 422 on the RPC/HTTPS pipe 450.

As with the illustrative examples shown in FIGS. 2 and 3, the remote client 429 in arrangement 400 is located behind an NAT firewall 455 and communicates to the helpdesk server 422 in a corporate network 453 through an external network 460.

Figure 5:
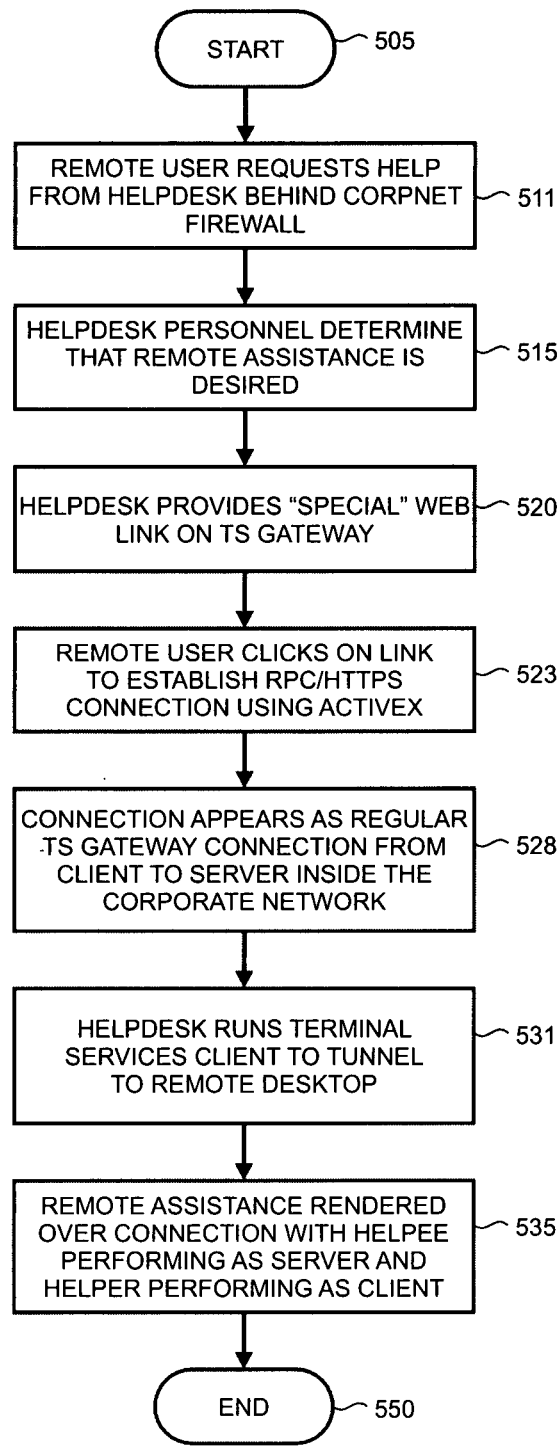
FIG. 5 is a flowchart of an illustrative method for enabling secure remote assistance between computers using a terminal services gateway.

Arrangement 400 is described using a flowchart of an illustrative method that is shown in FIG. 5. The method starts at block 505. At block 511, a user at the remote client 429 determines that assistance is needed and requests help from a helpdesk that is located behind a corporate network firewall (e.g., the firewall 242 in FIG. 2). At block 515, the helpdesk personnel determine that a remote assistance session would be desirable in order to resolve the remote user's problem.

At block 520, the helpdesk personnel provide a special web link 465 on the TS gateway 416. When the remote user clicks on the link, as indicated by block 523, a COM-based component such as ActiveX component 467 establishes an RPC/HTTPS connection with a plug-in module 472 that is installed on the TS gateway 416. The ActiveX component 467 is optionally downloadable by the remote client 429 from the TS gateway 416 or another source.

The plug-in module 472 is arranged for communicating to the Helpdesk server 422 hosting the remote assistance application/terminal services client 432. In one illustrative implementation, this includes listening on a pre-determined port, called the "remoted port" on the TS gateway 416. A connection request to this port or to the remote application/terminal services client 432 in an alternative implementation invokes a notification from the plug-in module 472 to the ActiveX component 467 to start establishing an RDP session and stream RDP data from the ActiveX component 467 to the RA application/TS client 432. As indicated at block 528, this connection appears to the TS gateway 416 as a regular TS gateway connection. In the case of the forwarded remote port, the connection appears to the TS gateway 416 as a remote port forwarded from the remote client 429 (i.e., TCP port number 3389).

At block 531, the helpdesk server 422 runs a remote assistance process which loads a terminal services client 432 and communicates with the TS gateway plug-in module 472 to thereby tunnel data through to the remote client's desktop. The established TS gateway connection between the plug-in module 472 and the ActiveX component 467 is used to support the remote assistance session, as indicated by block 535 in FIG. 5. That is, upon successful establishment of a terminal services session between the remote client 429 and the helpdesk server 422 using the TS gateway 416, their usual respective roles are reversed for the remote assistance session. The remote client 429 sends graphical RDP rendering data to the helpdesk server 422 to enable the helpdesk expert to see the problem at the remote client 429. In addition, RDP control messages (i.e., keyboard and mouse events) are sent from the helpdesk server 422 to temporarily control the remote client 429 during the remote assistance session. The illustrative method ends at block 550.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing remote assistance from a helpdesk server to a remote client behind a firewall, the method comprising the steps of:

hosting a link on a TS gateway, the TS gateway being co-located with the helpdesk server, so that the link, when followed by a user on the remote client, creates a secure connection between a COM-based component on the remote client and a plug-in module installed on the TS gateway;

receiving a connection request at the TS gateway, the connection request invoking a notification from the plug-in module at the TS gateway to the COM-based component at the remote client, to start establishing an RDP session, and, after the RDP session is established, establishing a tunnel from the helpdesk server through the firewall to the remote client over the secure connection through which remote assistance data is streamed;

receiving, at the helpdesk server, RDP rendering data originated from the remote client over the secure connection; and sending, from the helpdesk server, RDP control messages including keyboard and/or mouse events to the remote client over the secure connection, whereby the respective roles of the helpdesk server and remote client are reversed after the tunnel over the secure connection is established so that remote assistance is renderable from the helpdesk server to the remote client, the helpdesk server performing as a TS client, receiving RDP rendering data from the remote client, and the remote client performs as a TS server, receiving RDP control messages from the helpdesk server to control the remote client.

2. The method of claim 1 in which the secure connection is an SSL tunnel supporting remote procedure calls over HTTP.

3. The method of claim 1 in which an ActiveX component on the remote client creates the secure connection with the plug-in module exposed by the TS gateway.

4. The method of claim 1 further including steps of forwarding a remote port from the remote client to the TS gateway and receiving the connection request from the helpdesk server at the remote port.

5. The method of claim 4 including a further step of establishing a listener on the remote port, the listener sending a notification to the remote client when the connection request to the remote port is received.

6. The method of claim 5 in which the listener is embodied in the TS gateway plug-in module.

7. A method for providing remote assistance from a helpdesk server to a remote client that is behind a firewall, the method comprising the steps of:

receiving a remote assistance request from the remote client;

providing a link on a TS gateway that is co-located with the helpdesk, responsively to the request, for the remote client to follow for establishing a terminal services connection with a helpdesk server using a plug-in module, installed on the TS gateway, that communicates with a remote assistance process hosted by the helpdesk server;

creating the terminal services connection between the TS gateway and the remote client upon activation of the link by a user at the remote client;

implementing reverse traversal of the terminal service connection, from the helpdesk server to the remote client, to create a secure tunnel through the firewall to the remote client;

receiving, at the helpdesk server, rendering data originated from the remote client over the secure tunnel; and sending, from the helpdesk server, control messages including keyboard and/or mouse events to the remote client over the secure tunnel, whereby the helpdesk server functions as a terminal services client after the reverse traversal is implemented to thereby provide the remote assistance to the remote client, and the reverse traversal of the terminal service connection causes the helpdesk server, functioning as a terminal services client, to receive the rendering data from the remote client, and the remote client, functioning as a TS server, to receive the control messages from the helpdesk server to control the remote client.

8. The method of claim 7 including a further step of streaming remote assistance data through the secure tunnel created between the helpdesk server and the remote client.

9. The method of claim 7 in which the firewall comprises a NAT device.

10. The method of claim 7 in which the link is a web link hosted by the TS gateway.

11. The method of claim 7 in which the terminal services connection is implemented using RDP through HTTPS over an Internet connection.

12. The method of claim 7 in which the remote assistance process is arranged to load a terminal service client on the helpdesk server.

13. A computing device that includes one or more processors and one or more computer-readable storage media disposed in a remote client behind a firewall that enables a remote assistance session with a helpdesk server of an enterprise network, by causing the device to:

establish a terminal services connection, with a TS gateway being co-located with the helpdesk server, using a COM component, by following a link hosted on the TS gateway by a user on the remote client device; remote a port from the client to the TS gateway through the terminal services connection; receive a notification from the TS gateway when a connection request to the remoted port is received by the TS gateway, the notification invoking a method for connecting the COM component with a terminal services process running on the client to start establishing an RDP session, and after the RDP session is established, establishing a tunnel from the helpdesk server through the firewall to the remote client over the secure connection through which remote assistance data is streamed;

send, to the helpdesk server, RDP rendering data from the remote client over the secure connection; and receive, from the helpdesk server, RDP control messages including keyboard and/or mouse events to the remote client over the secure connection, whereby the respective roles of the helpdesk server and remote client are reversed after the tunnel over the secure connection is established so that remote assistance is renderable from the helpdesk server to the remote client, the helpdesk server performing as a TS client, receiving RDP rendering data from the remote client, and the remote client performs as a TS server, receiving RDP control messages from the helpdesk server to control the remote client.

14. The one or more computer-readable media of claim 13 in which the terminal services connection is implemented with an Internet connection using SSL.

15. The one or more computer-readable media of claim 13 in which the RDP data comprises graphics rendering data.

* * * * *